United States Patent [19]

Omiya

[11] Patent Number: 5,157,407
[45] Date of Patent: Oct. 20, 1992

[54] TRACKING ANTENNA APPARATUS ON VEHICLE FOR SATELLITE COMMUNICATION

[75] Inventor: Yoshitaka Omiya, Yokohama, Japan

[73] Assignee: Kabushiki Kaisha Toshiba, Kawasaki, Japan

[21] Appl. No.: 794,994

[22] Filed: Nov. 19, 1991

[30] Foreign Application Priority Data

Nov. 20, 1990 [JP] Japan .................. 2-314756

[51] Int. Cl.$^5$ .................. H04B 7/185; G01S 5/02
[52] U.S. Cl. .................. 342/357
[58] Field of Search .................. 342/357, 356, 457; 364/449

[56] References Cited

U.S. PATENT DOCUMENTS 4,719,469 1/1988 Beier et al. .................. 342/434
4,881,080 11/1989 Jablonski .................. 342/357

Primary Examiner—Theodore M. Blum
Attorney, Agent, or Firm—Cushman, Darby & Cushman

[57] ABSTRACT

A tracking antenna apparatus mounted on a vehicle for a satellite communication according to the present invention has first and second antennas having different phase centers thereof and disposed to detect the frame synchronization signal period of a reception frame from the reception signal of either one antenna. The reception signals of the first and second antennas are sequentially output during the detected frame synchronization signal period, the phase difference of the reception signals is detected, the direction error of the first and second antennas is calculated from the detected phase difference, and the directions of the first and second antennas are corrected on the basis of the direction error.

10 Claims, 9 Drawing Sheets

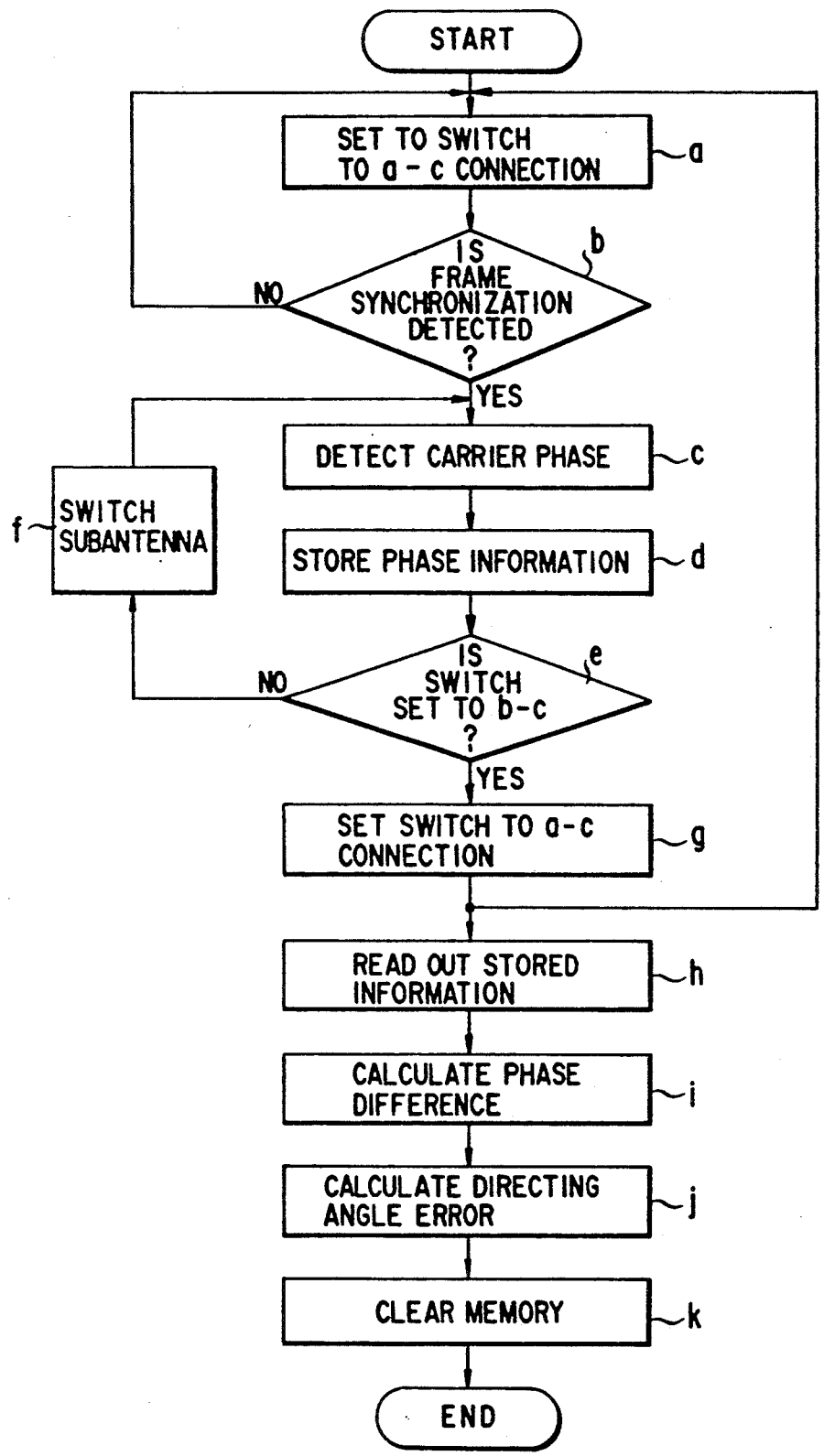
F I G. 5

TRACKING ANTENNA APPARATUS ON VEHICLE FOR SATELLITE COMMUNICATION

BACKGROUND OF THE INVENTION

1. Field of the Invention

The present invention relates to a tracking antenna, for example, mounted on a vehicle such as an automobile for controlling to direct a beam toward a communication satellite for a satellite communication.

2. Description of the Related Art

In general, there has been known a tracking antenna apparatus of this type for tracking a communication satellite in which the bearing angle of a vehicle to be carried is detected by an azimuth detection sensor such as a magnetic compass, and a beam direction is sequentially corrected in response to detection information. However, since this method is vulnerable to various kinds of noise inputs due to its arrangement, the reliability of directional control is deteriorated. In addition, this method requires such a sensor apparatus.

On the other hand, there has been also known an antenna apparatus of the type for stepwisely tracking a communication satellite by periodically monitoring the intensity of a reception signal, comparing the intensities of the respective reception signals, and controlling to direct a beam so that the intensity of the reception signal becomes maximum. However, generally low signal-to-noise ratio in satellite communication requires a relatively long measuring time to accurately detect the intensity of the reception signal. Therefore, it is difficult to cope with an abrupt direction change of a vehicle.

There has been also known an antenna apparatus of the type having two independent antenna systems in which the phase difference of the reception signals of the two antennas is obtained and a beam direction is controlled to be directed in response to the phase difference, thereby rapidly and accurately tracking a satellite. However, since this type needs two antenna systems, and it is necessary to obtain sufficient reception gain at each antenna, the entire arrangement is inefficiently increased in scale.

Such circumstances are the same, regardless of the types such as a mechanical scanning type, an electronic scanning type, etc.

SUMMARY OF THE INVENTION

As described above, the conventional tracking antenna apparatus mounted on a vehicle for a satellite communication has problems in which the reliability of a beam directing control is deteriorated, a rapid remedy is difficult, the entire antenna is increased in size, and it is inefficient.

Accordingly, it is an object of the present invention to provide a tracking antenna apparatus which can rapidly and accurately control to direct a beam while maintaining a minimum size of the antenna.

According to the present invention, there is provided a tracking antenna apparatus mounted on a vehicle for a satellite communication comprising:

first and second antennas having different phase centers;

switching means for selectively outputting any of reception signals of the first and second antennas;

frame synchronization detecting means for detecting a frame synchronization signal period from reception signal output from the switching means;

switching control means for controlling the switching means to output the reception signals of the second antenna during a frame synchronization signal period detected by the frame synchronization detecting means;

phase difference detecting means for detecting a phase difference between the reception signals of the first and second antennas output from the switching means;

calculating means for calculating the direction error of the first and second antennas from the phase difference obtained by the phase difference detecting means; and antenna drive control means for correcting the directions of the first and second antennas on the basis of a direction error obtained by the calculating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flowchart showing the processing flow of a CPU of the first embodiment;

DETAILED DESCRIPTION OF THE PREFERRED EMBODIMENTS

Embodiments of the invention is described in detail below with reference to the accompanying drawings.

Figure 1:
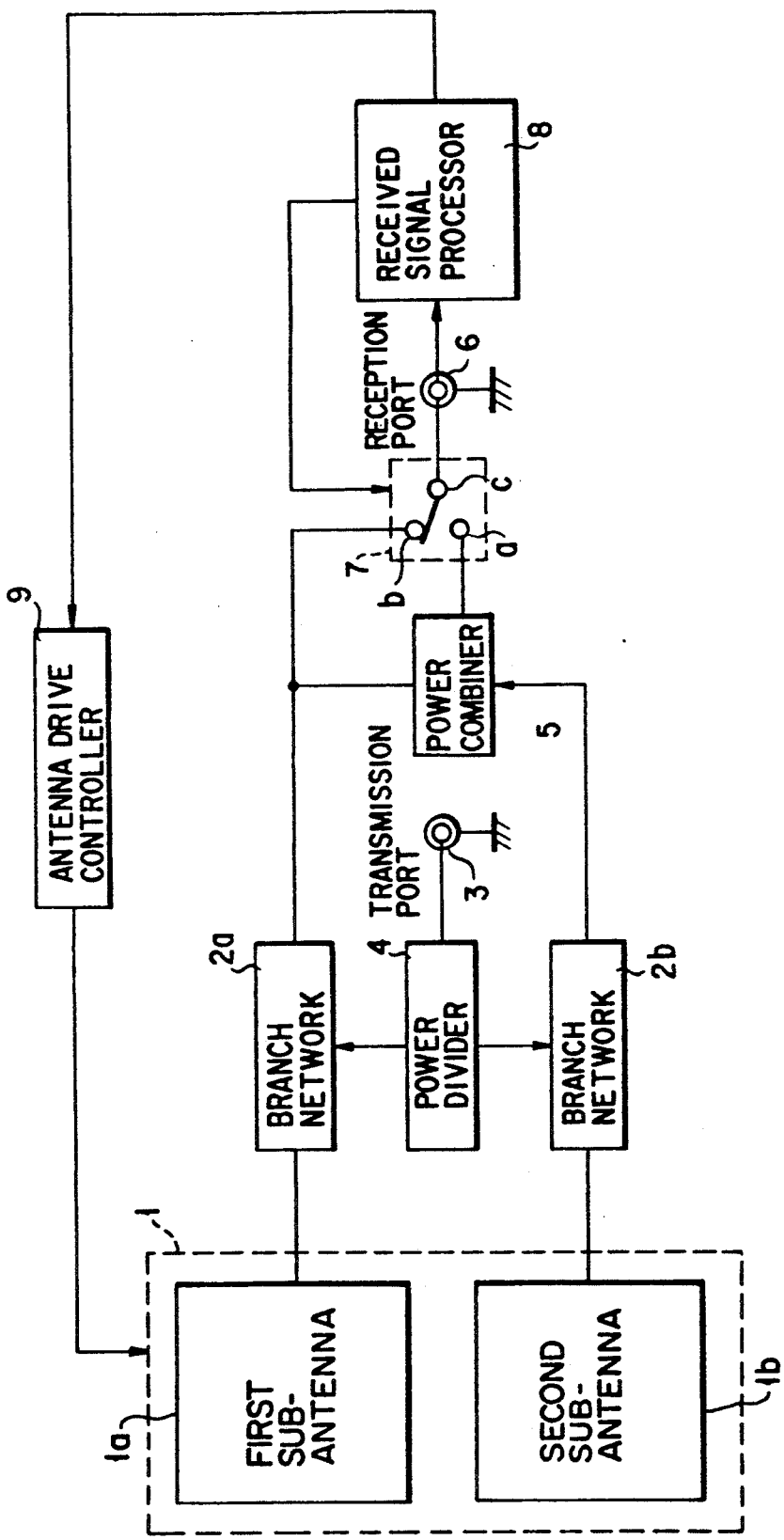
FIG. 1 is a block diagram showing the basic constitution of a tracking antenna apparatus mounted on a vehicle for a satellite communication of a first embodiment according to the present invention.

FIG. 1 shows a tracking antenna apparatus mounted on a vehicle for a satellite communication according to an embodiment of the present invention. In FIG. 1, a main antenna 1 is an array antenna, which is mounted on a vehicle such as an automobile, though not shown, and directed toward a communication satellite. Subantenna 1a is composed of at least partial one antenna element of antenna elements which constitute the main antenna 1. In the embodiment, the main antenna 1 is divided into first and second subantennas 1a and 1b for the convenience of simplicity of description.

Figure 2:
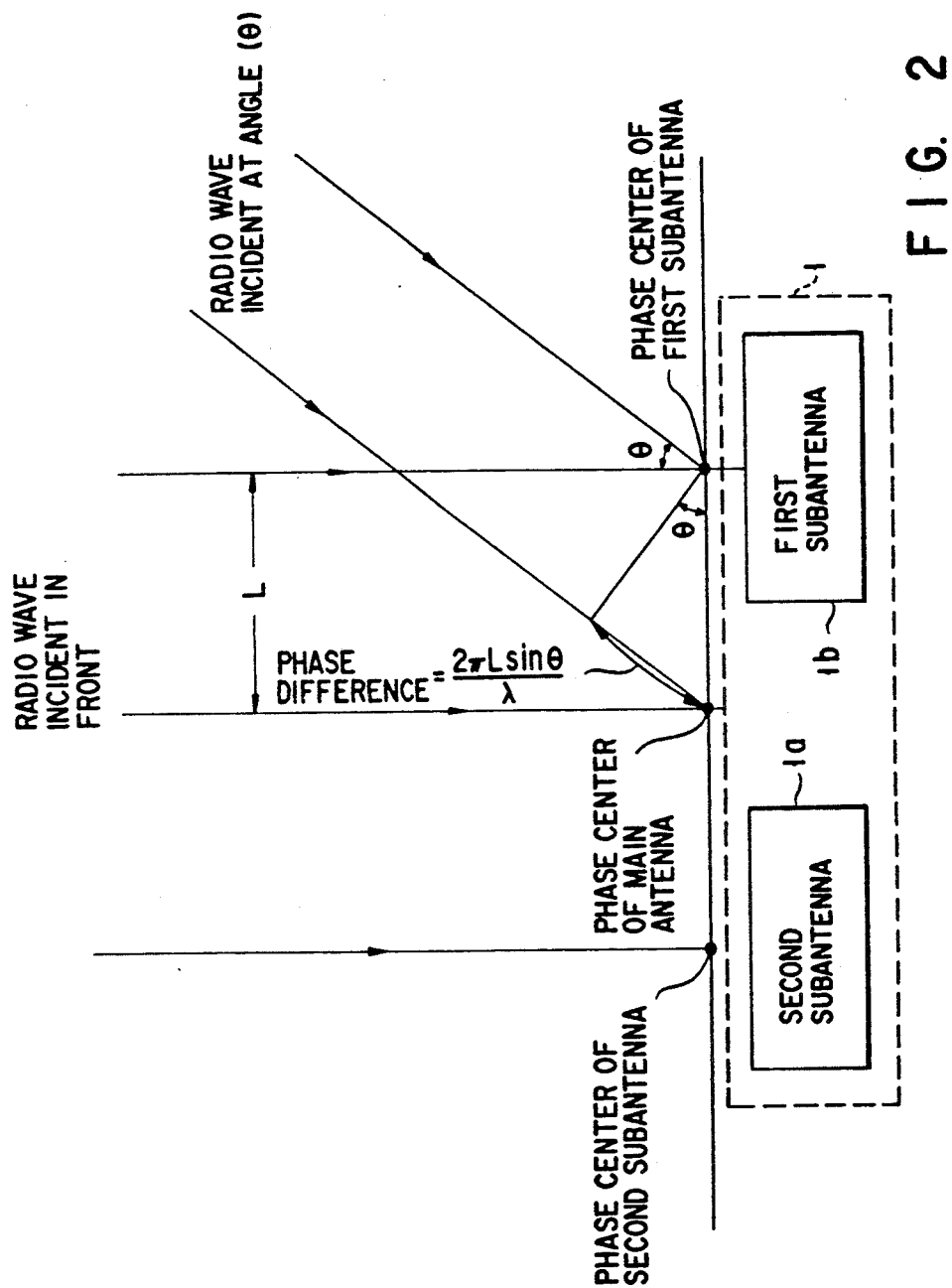
FIG. 2 is a view showing the disposing relationship of a main antenna of the first embodiment.

As shown in FIG. 2, the phase centers of the first and second subantennas 1a and 1b are lined up with the phase center of the main antenna 1, and the phase center of the first subantenna 1a is separated by distance L from that of the phase of the main antenna 1. As shown in FIG. 1, branch networks 2a and 2b are respectively connected to the signal input/output ends of the first and second subantennas 1a and 1b.

In FIG. 1, a transmission signal input terminal 3 is connected to a transmission port of a transmitter (not shown). A transmission signal supplied to the input terminal 3 is distributed by a power divider 4 to the first and second subantennas 1a and 1b through the branch networks 2a and 2b of two systems.

Signals collected by the subantennas 1a and 1b are transmitted to a power combiner 5 through the branch networks 2a and 2b, respectively. The power combiner 5 combines the reception signals from both subantennas 1a and 1b, and outputs it to an output terminal 6. The reception port of a received signal processor 8 is connected to the output terminal 6.

The output of the power combiner 5 is supplied to one stationary terminal a of a switch circuit 7. The reception signal of the first subantenna 1a output from the branch network 2a is supplied to the other stationary terminal b of the switch circuit 7. The switch circuit 7 connects a common terminal c to any one of the stationary terminals a and b in response to a switching signal from a received signal processor 8 to be described in detail later. The reception signal sent to the common terminal c is supplied to the received signal processor 8.

The received signal processor 8 detects a frame synchronization period from the input signal, switches the switch circuit 7 during this period to obtain a phase difference between the phase of the reception output of the main antenna 1 and the phase of the reception output of first subantenna 1a, and calculates an error of the directing angle of the main antenna 1 from the phase difference. The error information is sent to an antenna drive controller 9. The antenna drive controller 9 corrects the directing direction of the main antenna 1 on the basis of the error information.

Figure 3:
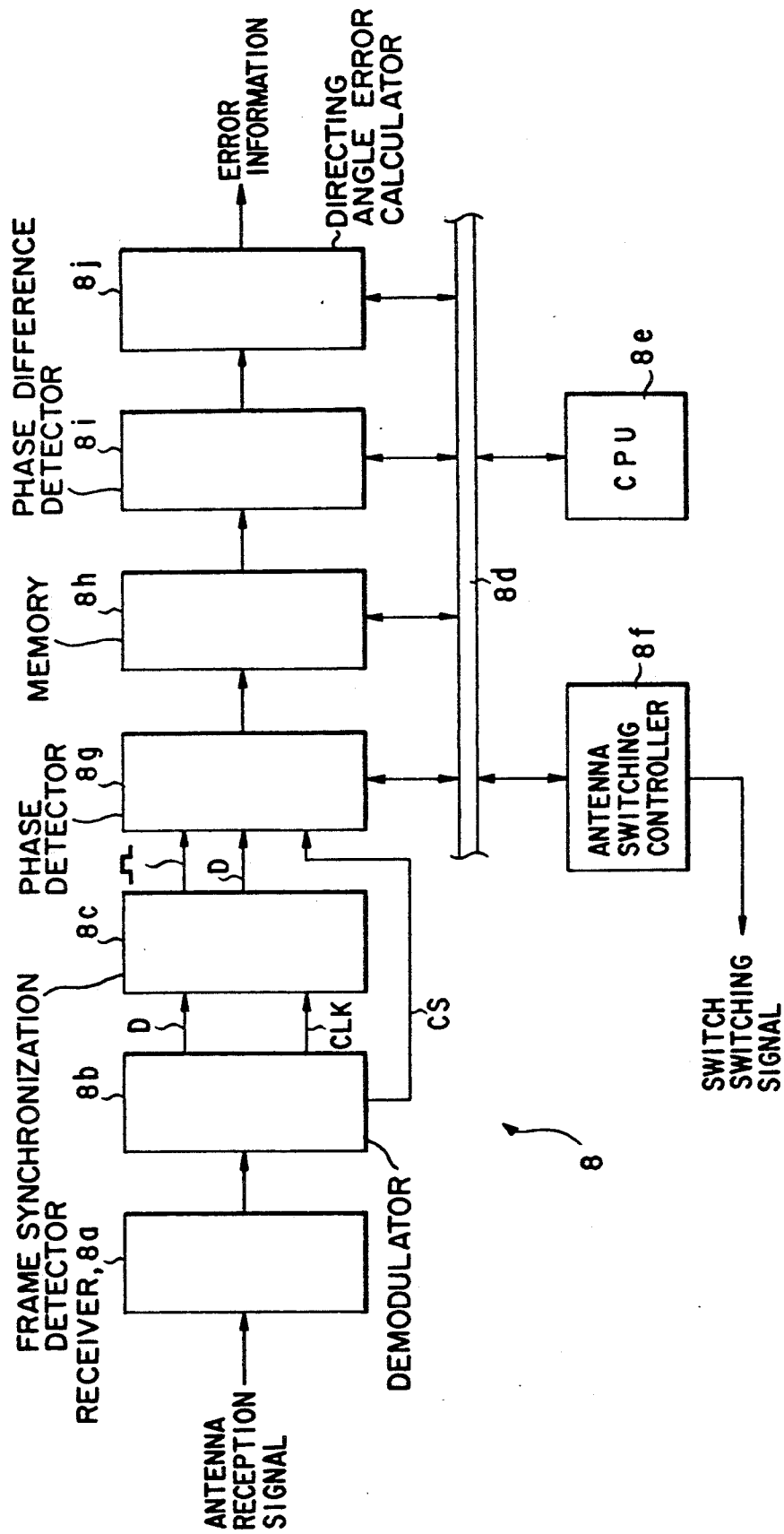
FIG. 3 is a block diagram showing the constitution of a received signal processor of the first embodiment.

The received signal processor 8 is constituted as shown in FIG. 3.

The signal input to the received signal processor 8 is supplied to a receiver 8a, amplified, detected, and sent to a demodulator 8b. The demodulator 8b first regenerates a carrier signal CS from the input signal, and sends the regenerated carrier signal SC to a phase detector 8g of the rear stage. The demodulator 8b further regenerates a clock CLK, and demodulates data D from the input signal on the basis of the regenerated clock CLK. The demodulated data D is supplied together with the regenerated clock CLK to a frame synchronization detector 8c.

The frame synchronization detector 8c detects a frame synchronization signal period from the frame in the demodulated data D on the basis of the clock CLK. The detection information of the detected frame synchronization signal period is sent to a central processing unit (CPU) 8e through a bus 8d. The CPU 8e totally controls the calculation of the error of the antenna directing angle, and preferably sends a control command to an antenna switching controller 8f, the phase detector 8g, a memory 8h, a phase difference detector 8i, a directing angle error calculator 8j connected to the bus 8d.

The antenna switching controller 8f generates a switching signal responsive to the control command from the CPU 8e, and sends the switching signal to the switch circuit 7. The phase detector 8g inputs a carrier signal CS from the demodulator 8b in response to the control command from the CPU 8e, and detects the phase by a digital signal processing method. The memory 8h stores phase information obtained from the phase detector 8g in response to the control command from the CPU 8e.

The phase difference detector 8i inputs two phase control command from the CPU 8e, and calculates its phase difference. The directing angle error calculator 8j inputs the phase error information obtained from the phase difference detector 8i in response to the control command from the CPU 8e, converts the phase difference information to the directing angle error of the main antenna 1, and sends the error information to the antenna drive controller 9.

The isolation of a transmitter and a receiver respectively connected to the transmission signal input terminal 3 and the reception signal output terminal 6 is performed by designing a transmission line combined with respective band filters by using the difference of the frequency bands of the transmission and the reception.

The operation of the embodiment of the tracking antenna apparatus of the invention constituted as described above will be described.

Figure 4:
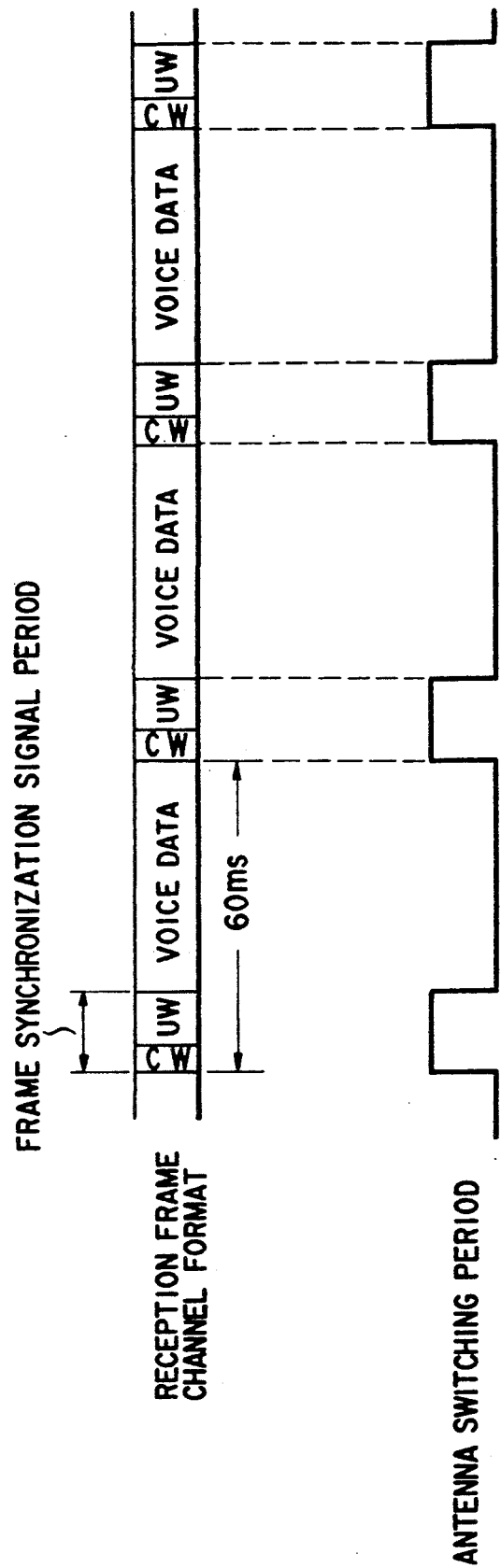
FIG. 4 is a view showing the format of received data of the first embodiment.

In general, a predetermined synchronizing signal is provided in each frame of a data format used for a satellite communication. A data format example for a voice channel is shown in FIG. 4. In this example, a frame synchronization data consisting of CW (carrier regenerating preamble) and UW (unique word) is provided at the head of each frame (60 [ms]), and encoded voice data are added to the rear of the frame synchronization data. In general, the synchronization data pattern is predetermined, and the synchronization in the frame is performed by identifying the pattern.

When a radio wave carrying the data of such a format is received by the first and second subantennas 1a and 1b, the outputs of the subantennas 1a and 1b are sent to the power combiner 5 through the branch network 2a and 2b, and the combined. The composite signal corresponds to the output of the main antenna 1. The switch circuit 7 outputs the composite signal in the connecting state between contacts a and c. When the switch circuit 7 is switched to the connecting state between contacts b and c by the switching signal, the switch circuit 7 produces the output of the first subantenna 1a. The output of the antenna selected by the switch circuit 7 is sent to the received signal processor 8 through the switch circuit 7.

In the received signal processor 8, the input signal is amplified, detected by the receiver 8a, and sent to the demodulator 8b. The demodulator 8b regenerates the carrier signal CS and the clock CLK from the input signal, and further demodulates data train D. The carrier signal CS is supplied to the phase detector 8g of the rear stage, and the regenerated clock CLK is supplied together with the demodulated data D to the frame synchronization detector 8c.

When the frame synchronization detector 8c detects the frame synchronization signal period of the reception frame from the demodulated data train D, the detection information is sent to the CPU 8e through the bus 8d. The CPU 8e sends control commands to functional blocks according to a processing flow in FIG. 5.

In FIG. 5, the switch circuit 7 is set to the connecting state of the contacts a-c through the antenna switching controller 8f, the combined signal is input (in step a), and a frame synchronization signal period detection information from the frame synchronization detector 8c is waited (in step b). When this detection signal is obtained (Y in FIG. 5), the phase of the carrier signal CS is detected by the phase detector 8g (in step c), and the phase detection information is stored in the memory 8h (in step d). This detection information is a carrier phase information of the reception signal of the main antenna 1.

Then, in FIG. 5, the connecting state of the switch circuit 7 is confirmed (in step e), if the switch circuit 7 is not set to the connecting state of the contacts b-c (N in FIG. 5), the switch circuit 7 is switched to the connecting state of the contact b-c, and the first subantenna signal is input (in step f). Since it already falls within the frame synchronization signal period at this time, the operation is returned to the step c, and the carrier phase information of the reception signal of the first subantenna 1a is detected, and stored in the memory 8h in the step d.

After the phase information of both antenna signals are stored in the memory 8h, the switch circuit 7 is set to the connecting state of the contact a-c, the antenna combined signal is input, and next frame synchronization signal period detection information is waited (in step g). The two carrier phase informations stored in the memory 8h are read out during the period (in step h), and the phase difference is obtained by the phase difference detector 8i (in step i). Further, the directing angle error to the radio wave coming direction of the main antenna 1 is obtained from the phase difference information by the directing angle error calculator 8j, this error information is sent to the antenna drive controller 9 to correct the directing angle error of the main antenna 1 (in step j). Then, the content stored in the memory 8h is erased, and next carrier phase information is waited (in step k).

The principle of the above-described operation will be described by referring to FIG. 2.

If a radio wave comes from in the front of the main antenna 1, the main antenna 1 and the first subantenna 1b can receive the radio wave in the same phase. Since the phase centers of the main antenna 1 and the first subantenna 1a are at a distance L on a plane perpendicular to the antenna boresight, if the radio wave incident direction is deviated by an angle $\theta$ from the boresight axis, the phases of the reception signals of the received radio waves of the antenna 1 and the first subantenna 1a are deviated as below.

$$\Delta\theta = 2\pi L \sin\theta / \lambda$$

where $\lambda$ is the wavelength of the reception signal.

More specifically, when the main antenna 1 is correctly directed toward the satellite, the phases of the received signals of both the main antenna 1 and the first subantenna 1a coincide, but if the radio wave incident direction to the main antenna 1 and the first subantenna 1a is deviated at an angle $\theta$ from the boresight axis, the phases of the reception signals of both the antenna 1 and the first subantenna 1a are deviated at an angle $\Delta\theta$ in response to the deviated angle $\theta$. The radio wave incident direction can be reversely obtained by measuring the deviation $\Delta\theta$, and the deviation of the main antenna 1 to the direction can be corrected by the antenna driver.

Therefore, in the embodiment of the tracking antenna apparatus of the arrangement as described above, the phase difference $\Delta\theta$ between the reception signals of the main antenna 1 and the first subantenna 1a is obtained according to the above-described equation by the received signal processor 8, the directing angle error $\theta$ of the main antenna 1 is calculated on the basis of the phase difference, and sent to the antenna drive controller 9. The antenna drive controller 9 controls to drive the direction of the main antenna 1 so as to correct the error.

Since the gain of the first subantenna 1a is lower than that of the main antenna 1, there arises a problem that, if the actual information transmitted portion is received by the first subantenna 1a, necessary reception quality (signal-to-noise ratio) cannot be obtained. Therefore, according to the present invention, as in the above-described embodiment, at least the phase of the reception signal of the subantenna 1a is detected by using the known data pattern portion for the frame synchronization of the reception data train. Thus, the deterioration of the quality of the information portion of the reception signal is eliminated. Particularly, sufficiently accurate phase measurement can be performed by increasing the length of the synchronization pattern.

As the phase error detecting period, a speed responsive to a frame period is used in terms of a frame unit. For example, in the case of the voice data shown in FIG. 4, it is normally divided by a frame of about 60 msec. Therefore, if the turning rate of the vehicle to be placed for the antenna is about 30° per one second, the antenna can sufficiently follow up at a high speed.

As described above, the tracking antenna apparatus of the embodiment described above comprises the main antenna 1 having the first and second subantennas 1a and 1b, selectively picks up the reception signal of the first subantenna 1a, obtains the phase difference between the reception signal of the main antenna 1 and the reception signal of the first subantenna 1a, and controls the direction of the main antenna 1 on the basis of the phase difference. According to the embodiment of the tracking antenna apparatus of the invention, since the direction controlling phase difference information is obtained on the basis of the reception signal of the main antenna 1 and the reception signal of the first subantenna 1a for constituting the portion of the main antenna 1, the apparatus can be reduced in size substantially similarly to the conventional antenna, and the direction of the beam of the antenna can be accurately controlled.

Further, the embodiment of the tracking antenna apparatus is also constituted to pick up the output carriers from the main antenna 1 and the first subantenna 1a during the reception frame synchronization signal period, to obtain the phase difference between both and to control to direct the main antenna 1. According to this arrangement of the embodiment, the phase difference can be detected without deterioration of the quality of the reception signal, and can rapidly and accurately control the direction of the antenna.

In the embodiment described above, the case that one antenna is used simultaneously for both the transmission and reception. In other words, the branch networks 2a and 2b are constituted such that a transmission antenna is not affected by the influence of the switching state of the main/sub antenna in the reception mode. According to this arrangement of the embodiment, the antenna can track the direction of the satellite irrespective of the transmitting and receiving period, and its effective radiation power at the time of transmission of the antenna is not lost. Further, the present invention is not limited to the embodiment, but can also be applied to a reception only tracking antenna apparatus.

In the embodiments described above, the phase comparison of the reception signals of the main antenna 1 and the first subantenna 1a is not simultaneously performed, but the radio wave is received by the main antenna 1 during a certain period, it is received by the first subantenna 1a during the remaining period, and both the reception signals are compared. However, the present invention is not limited to the particular embodiment. For example, even if the reception outputs of the two subantennas 1a and 1b for constituting the main antenna 1 are compared, similar process to the above first embodiment can be performed. In addition, a small-sized subantenna composed of at least one antenna element separately from a main antenna is provided, and the phase difference may be detected by using the subantenna and the main antenna.

In the embodiments described above, the case that the present invention is applied to the tracking antenna apparatus of the type for mechanically scanning a beam direction has been described. However, the present invention is not limited to the particular embodiment. For example, the present invention may also be applied to a tracking antenna apparatus of the type for electronically scanning the beam direction of an antenna element. In the case of the electronic scanning type, the same effect as that of the abovedescribed embodiment is obtained by constituting to detect the intensity of a reception signal during a reception frame synchronization signal period and to control the beam direction in response to the signal intensity. The arrangement of this case is shown in FIG. 6.

Figure 6:
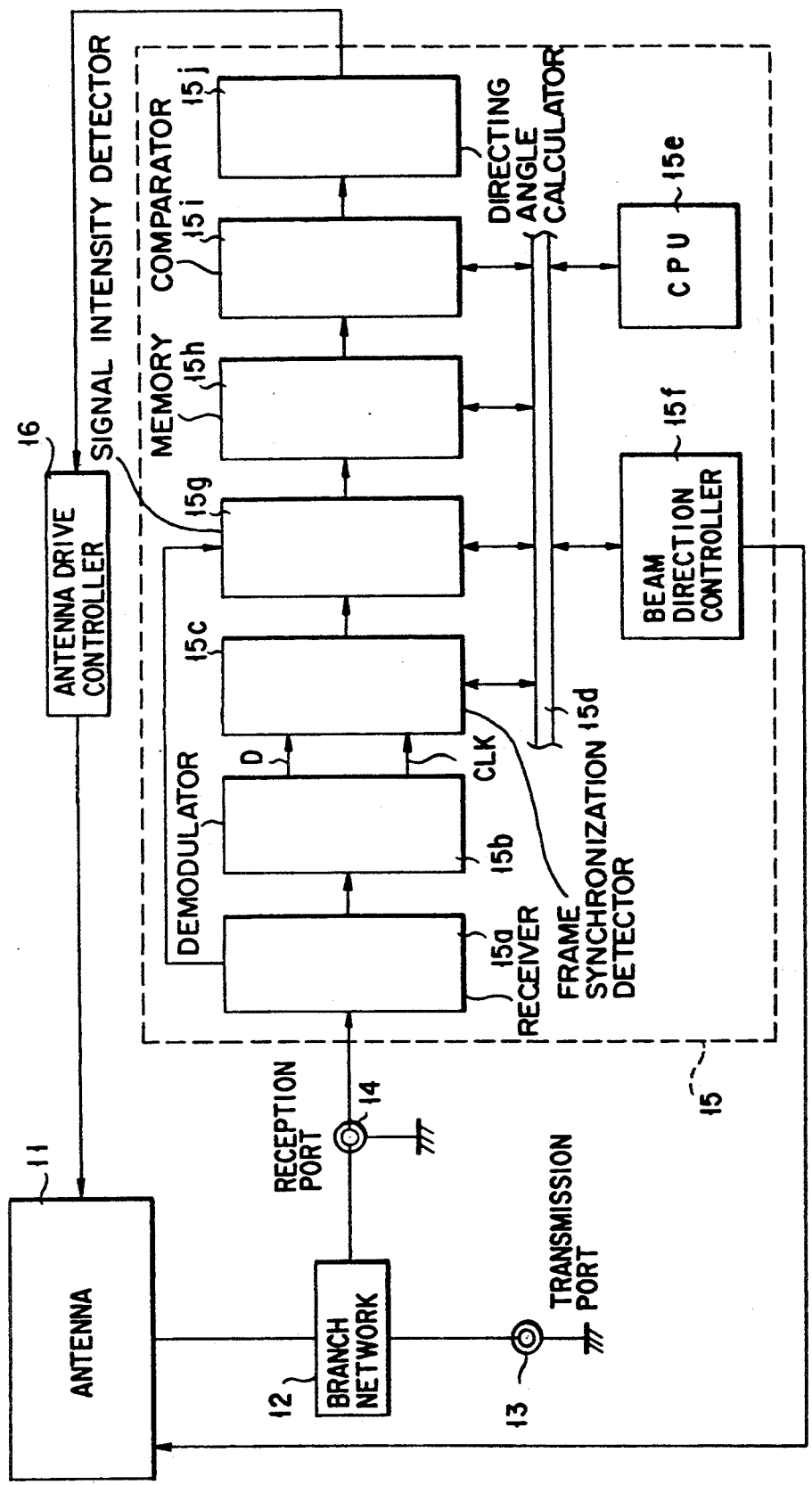
FIG. 6 is a block diagram showing the constitution of a tracking antenna apparatus mounted on a vehicle for a satellite communication of a second embodiment according to the present invention.

In FIG. 6, the tracking antenna apparatus of the type for electronically scanning the beam direction of the antenna element comprises an electronic scanning type array antenna 11, which is connected to a transmission signal input terminal 13 and a reception signal input terminal 14 through a branch network 12. A transmission port of a transmitter (not shown) is connected to the input terminal 13, and a reception port of a received signal processor 15 is connected to the output terminal 14.

An antenna reception signal introduced by the branch network 12 is supplied to a signal processor 15. In the received signal processor 15, the input reception signal is amplified and detected by a receiver 15a, and then supplied to a demodulator 15b. In the demodulator 15b, a carrier signal CS and a clock CLK are regenerated from the reception signal, and data D is further demodulated on the basis of the regenerated clock CLK. The demodulated data D is sent together with the regenerated clock CLK to a frame synchronization detector 15c.

The frame synchronization detector 15c detects a frame synchronization signal period from the frame in the demodulated data D on the basis of the clock CLK. The detection information of detected the frame synchronization signal period is sent to a central processing unit (CPU) 15e through a bus 15d. The CPU 15e totally controls the calculation of the antenna directing angle, and preferably sends a control command to a beam direction controller 15f, a signal intensity detector 15g, a memory 15h, a comparator 15i, a directing angle calculator 15j connected to the bus 15d.

The beam direction controller 15f for example control the phase shifters associated with of the phased array antenna 11 in response to the control command from the CPU 15e to electrically control the direction of the antenna beam. The signal intensity detector 15g detects a reception signal input level (intensity) in response to the control command from the CPU 15e by digital processing. The memory 15h stores signal intensity information obtained from the signal intensity detector 15g in response to the control command from the CPU 15e.

The comparator 15i compares a plurality of signal intensity informations stored in the memory 15h in response to the control command from the CPU 15e, and obtains the maximum intensity. The directing angle calculator 15j inputs the maximum signal intensity information obtained from the comparator 15i in response to the control command from the CPU 15e, and calculates an antenna direction angle of a target from the beam direction angle at this time.

The antenna directing angle information obtained by the received signal processor 15 is sent to the antenna drive controller 16. The antenna drive controller 16 drives the antenna 11 to become the given directing angle to correct the antenna direction.

In the embodiment described above, the isolation of a transmitter and a receiver respectively connected to the transmission signal input terminal 13 and the reception signal output terminal 14 is performed by designing a transmission line combined with respective band filters by using the difference of the frequency bands of the transmission and the reception.

The operation of the embodiment of the tracking antenna apparatus of the arrangement as described above will be described by referring to FIG. 7.

When the radio wave carrying the data of the above-described format is received by the antenna 11, the antenna output is sent to the receiver 15a of the received signal processor 15 through the branch network 12, amplified and detected, and sent to the demodulator 15b. The carrier signal CS and the clock CLK are regenerated from the input signal by the demodulator 15b, and data train D is further demodulated. The regenerated clock CLK is supplied together with the demodulated data D to the frame synchronization detector 15c.

When the frame synchronization signal period of the reception frame is detected from the demodulated data train D by the frame synchronization detector 15c, the detection information is sent to the CPU 15e through the bus 15d. The CPU 15e sends control commands to respective functional blocks according to a processing flow in FIG. 7.

Figure 7:
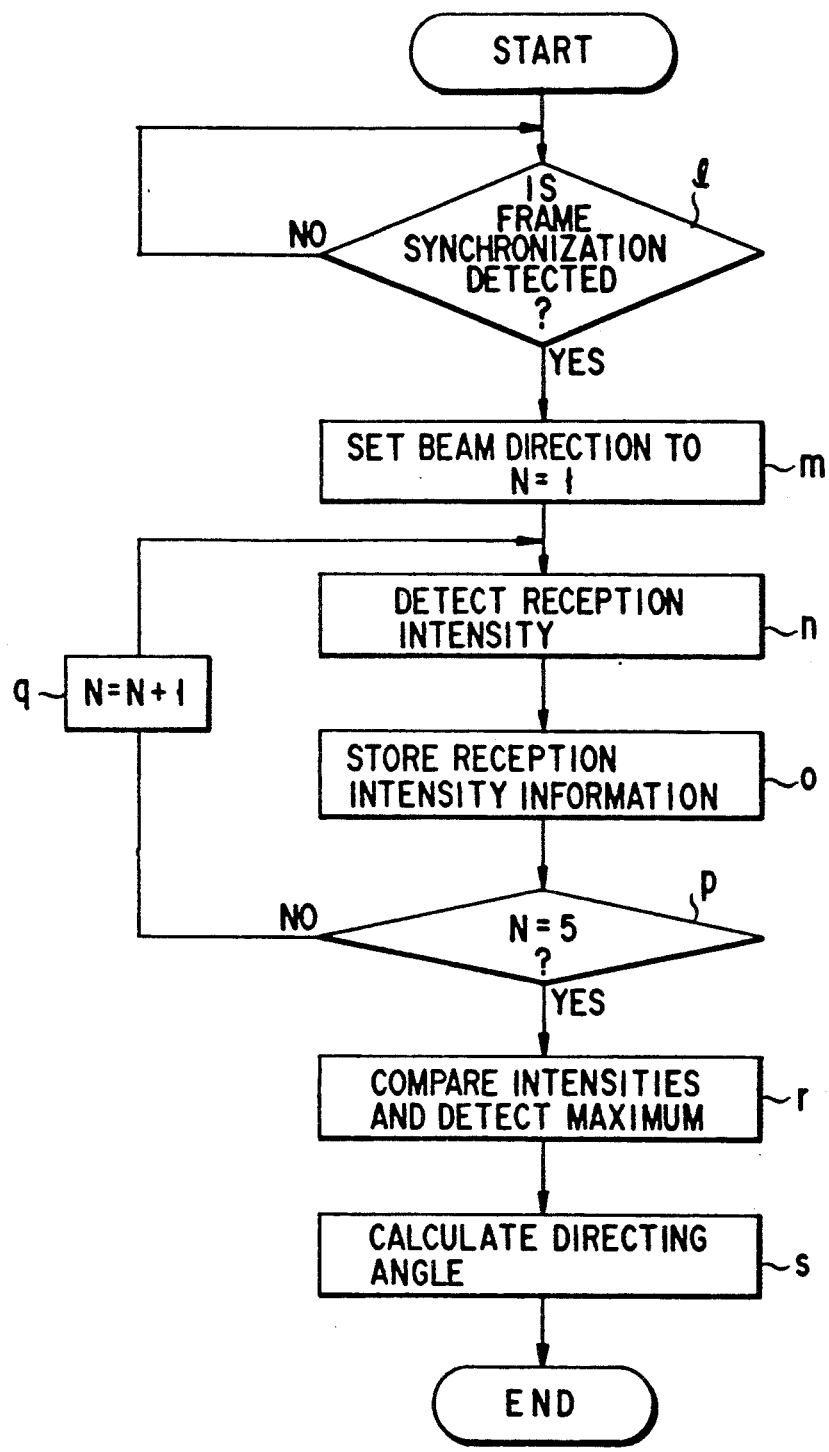
FIG. 7 is a flowchart showing the processing flow of a CPU of the second embodiment.
Figure 8:
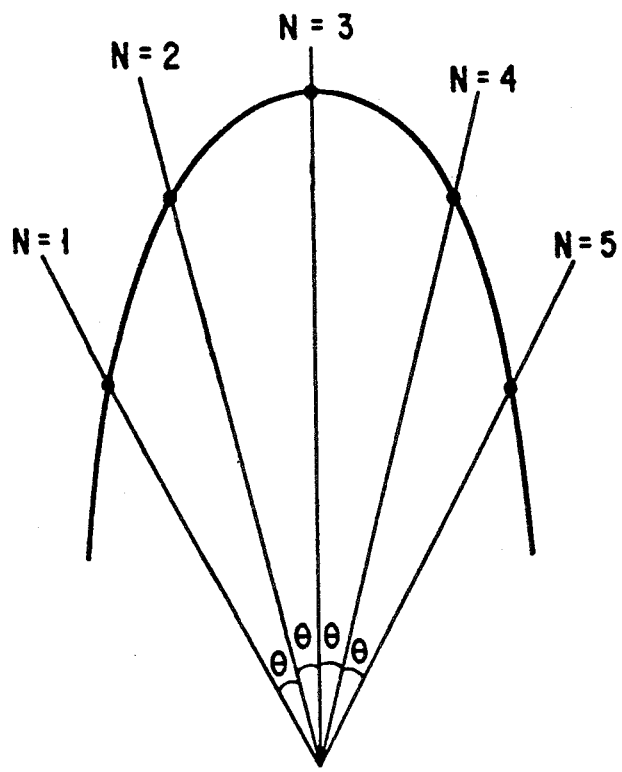
FIG. 8 is a view showing the state of a beam directing direction to be controlled to be switched in the second embodiment.

In FIG. 7, the frame synchronization signal period detection information from the frame, synchronization detector 15c is first determined (in step l). When the detection information is obtained (Y in FIG. 7), the beam direction is varied at an angle $-2\theta$ from the present direction (coincident with the antenna direction) by the beam direction controller 15f, and set to a first direction (N=1) shown in FIG. 8 (in step m). Then, the intensity of the reception signal input at this time is detected by the signal intensity detector 15g, and stored in the memory 15h. Then, whether or not N=5 is obtained is judged (in step p). If N=5 of the beam direction is not obtained (N in FIG. 7), N=N+1 is set to the beam direction (in step q), and the process is returned to a step n. That is, the beam direction is varied at each +θ, sequentially set up to fifth direction (N=5) in FIG. 8, the reception signal intensities are sequentially detected in the respective directions, and stored in the memory 15h.

If N=5 of the beam direction is obtained (Y in FIG. 7), five signal intensity informations are read out from the memory 15h, the maximum signal intensity of them is obtained by the comparator 15i (in step r), and the antenna directing angle to be an object is calculated from the beam direction at this time by the calculator 15j (in step s).

The antenna directing angle information obtained by the received signal processor 15 is sent to the antenna drive controller 16. Thus, the antenna 11 is controlled to be driven to the given directing angle and the direction of the antenna is corrected to the radio wave incident direction.

More specifically, the above-described embodiment relates to the type for controlling to direct the antenna in the direction of the strongest signal intensity by obtaining the signal intensities in a step tracking type. Since the tracking is controlled by using the frame synchronization signal period even in the arrangement of this embodiment, the signal intensity can be detected without deterioration of the quality of the reception signal, and the direction of the antenna can be rapidly and accurately controlled.

Figure 9:
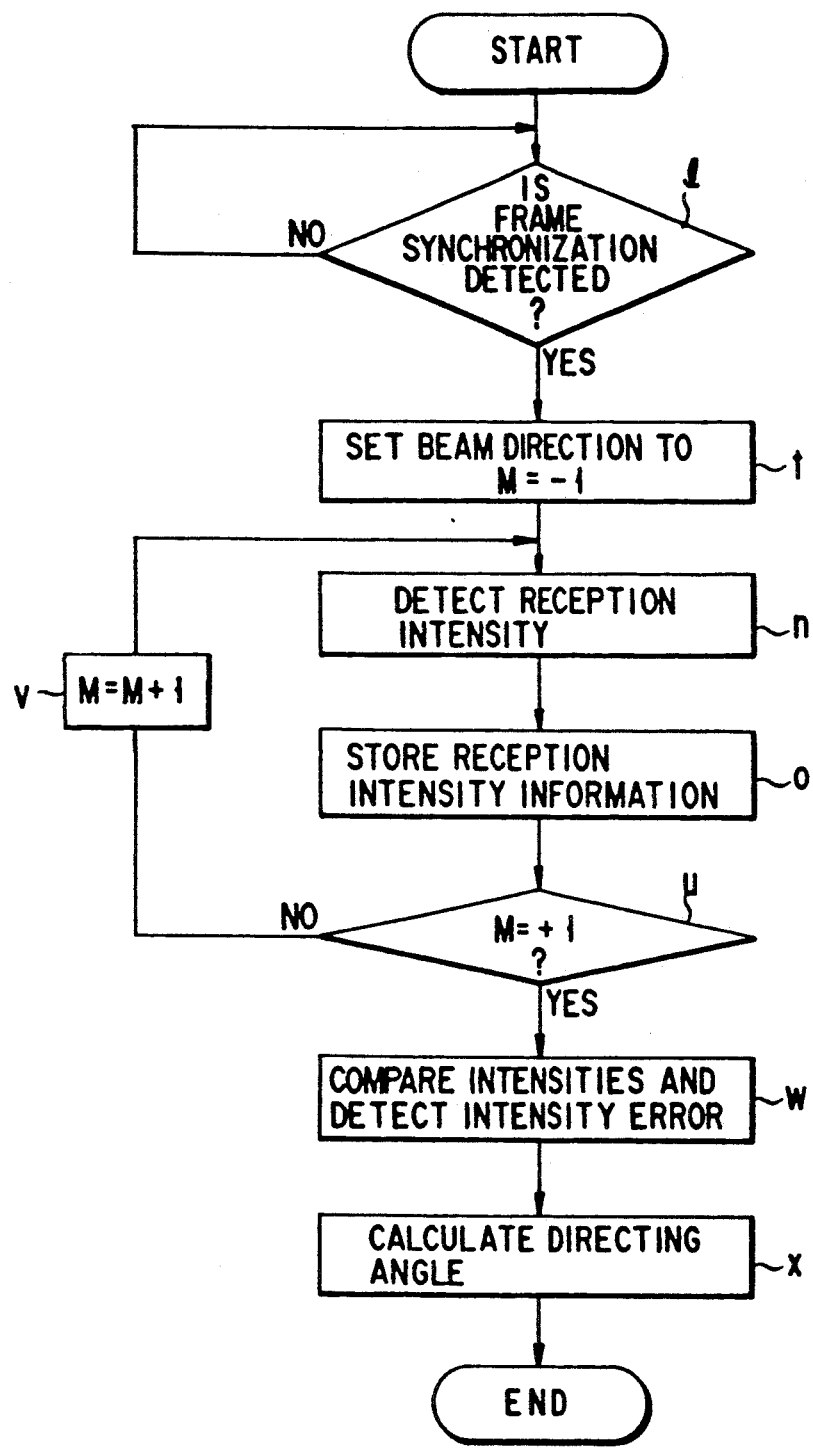
FIG. 9 is a flowchart showing the processing flow of a CPU of a third embodiment of a tracking antenna apparatus mounted on a vehicle for a satellite communication according to the present invention.

In the case of the type for electronically scanning, with the same arrangement as that shown in FIG. 6, the same process can be performed by means of the processing flow of the CPU 15e as shown in FIG. 9. In FIG. 9, the same steps as those shown in FIG. 7 are denoted by the same reference characters, and the description thereof will be omitted.

Figure 10:
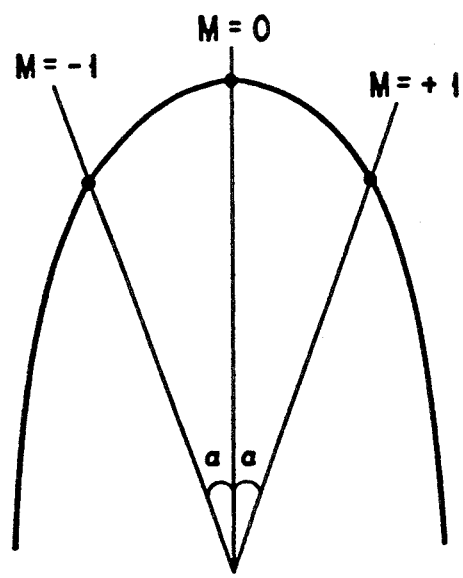
FIG. 10 is a view showing the state of a beam directing direction to be controlled to be switched in the third embodiment.

In FIG. 9, if the frame synchronization signal period detection information is obtained in step 1 (Y in FIG. 9), the beam direction of the antenna is varied at an angle −α from the present direction (coincident with the antenna direction), and set to a first direction (m=−1) shown in FIG. 10 (in step t). Then, the signal intensity at this time is detected in step n, and stored in the memory 15h in step o. Then, whether or not M=1 is obtained (in step u). If M=1 is not obtained (N in FIG. 9), the beam direction of the antenna is set to M=M+1 (in step v), and returned to step n. That is, the beam direction of the antenna is varied at each angle +α, sequentially set up to a third direction (M=+1) in FIG. 10, the reception intensities in the respective directions are detected, and stored in the memory 15h.

If M=+1 of the beam direction of the antenna is obtained in step u (Y in FIG. 9), three signal intensity informations are read out from the memory 15h, the signal intensities are compared to obtain the intensity difference therebetween (in step w), the direction of the beam of the antenna where the respective signal intensities substantially coincide is calculated as the target vale of the antenna directing angle (in step x).

More specifically, the embodiment described above relates to the type in which, with the center of the beams used as a reference, predetermined three signal intensities including the center of the beams are obtained and the beam direction is controlled to be directed such that the intensities at the detected positions become constant. According to the arrangement of the embodiment, the tracking is controlled by using the frame synchronization signal period. Therefore, the signal intensity can be detected without deterioration of the quality of the reception signal, and the beam direction of the antenna can be rapidly and accurately controlled.

In the tracking antenna apparatus of the type for electronically scanning, the signal intensity detection period is not always necessarily detected at every time of the frame synchronization signal period of the reception frame, but may be detected at every predetermined interval. In any case, since the reception signal intensity is detected during the reception frame synchronization signal period, it can be detected without adverse influence to the gain of the antenna, and the signal intensity can be detected by using the reception antenna and hence the tracking antenna apparatus can be reduced in size.

Various modifications may be made without departing from the spirit or scope of the general inventive concept of the present invention.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A tracking antenna apparatus mounted on a vehicle for satellite communication comprising:
   first and second antennas having different phase centers;
   switching means for selectively outputting any of reception signals of said first and second antennas;
   frame synchronization detecting means for detecting a frame synchronization signal period from a reception signal output from said switching means;
   switching control means for controlling said switching means to output the reception signals of said second antenna during a frame synchronization signal period detected by said frame synchronization detecting means;
   phase difference detecting means for detecting a phase difference between the reception signals of said first and second antennas output from said switching means;
   calculating means for calculating the direction error of said first and second antennas from the phase difference obtained by said phase difference detecting means; and
   antenna drive control means for correcting the directions of said first and second antennas on the basis of a direction error obtained by said calculating means.

2. The tracking antenna apparatus according to claim 1, wherein said first antenna is a main antenna having a plurality of antenna elements, and
   said second antenna is a subantenna formed of at least one of the antenna elements of said main antenna.

3. The tracking antenna apparatus according to claim 1, wherein said first antenna is a subantenna formed of at least one antenna elements of a main antenna having a plurality of antenna elements, and
   said second antenna is a subantenna formed of at least one of the elements of said main antenna.

4. The tracking antenna apparatus according to claim 1, wherein said first and second antennas are of mechanical scanning type.

5. The tracking antenna apparatus according to claim 1, wherein said first and second antennas are of electronic scanning type.

6. The tracking antenna apparatus according to claim 1, wherein said switching control means, said phase difference detecting means, said calculating means, and said antenna drive control means perform their functions at each frame.

7. A tracking antenna apparatus mounted on a vehicle for satellite communication comprising:

an antennae for electronically scanning a beam;

frame synchronization detecting means for detecting a frame synchronization signal period from a reception signal of said antenna;

beam direction control means for varying a beam direction of said antenna to a plurality of angles preset during a frame synchronization signal period;

signal intensity detecting means for detecting signal intensities of the reception signal when the beam direction is varied by said beam direction control means;

calculating means for calculating a target direction of said antenna from the signal intensities obtained by said signal intensity detecting means; and antenna drive control means for connecting the beam direction of said antenna based on of the target direction obtained by said calculating means.

8. The tracking antenna apparatus according to claim 7, wherein said calculating means compares the signal intensities obtained by said signal intensity detecting means to output the beam direction of the signal intensity which is maximum as the target direction of said antenna.

9. The tracking antenna apparatus according to claim 7, wherein said calculating means compares the signal intensities obtained by said signal intensity detecting means to obtain a beam direction substantially coincident with the respective signal intensities and to output the substantially coincident beam direction as the target direction of said antenna.

10. The tracking antenna apparatus according to claim 7, wherein said beam direction control means, said signal intensity detecting means, and said calculating means perform their functions at each frame of the antenna reception signal.

* * * * *